(12) United States Patent
Eckardt et al.

(10) Patent No.: US 9,464,747 B2
(45) Date of Patent: Oct. 11, 2016

(54) CONNECTOR FOR A HEATABLE FLUID LINE AND HEATABLE FLUID LINE

(75) Inventors: Carsten Eckardt, Bruchkoebel (DE); Stephan Mann, Biebergemuend (DE); Marc Rastetter, Biebergemuend (DE); Cameron Read, Hanau (DE); Knut Seibel, Altenstadt (DE)

(73) Assignee: NORMA GERMANY GMBH, Maintal (DE)

( * ) Notice: Subject to any disclaimer, the term of this patent is extended or adjusted under 35 U.S.C. 154(b) by 848 days.

(21) Appl. No.: 13/461,247

(22) Filed: May 1, 2012

(65) Prior Publication Data
US 2012/0291880 A1 Nov. 22, 2012

(30) Foreign Application Priority Data
May 20, 2011 (DE) .................. 10 2011 102 244

(51) Int. Cl.
*F16L 53/00* (2006.01)
*F16L 41/02* (2006.01)

(52) U.S. Cl.
CPC ............ *F16L 53/008* (2013.01); *F16L 41/023* (2013.01); *F01N 2610/10* (2013.01); *F01N 2610/14* (2013.01); *Y10T 29/49826* (2015.01); *Y10T 137/6606* (2015.04)

(58) Field of Classification Search
CPC .. F16L 53/008; F24H 1/009; F01N 2610/10; F01N 2610/105
See application file for complete search history.

(56) References Cited

U.S. PATENT DOCUMENTS

| 1,905,733 | A | 4/1933 | Moore |
| 2,141,797 | A | 12/1938 | Minella |
| 3,894,302 | A | 7/1975 | Lasater |
| 5,182,792 | A | 1/1993 | Goncalves |
| 5,859,953 | A * | 1/1999 | Nickless ............... F16L 53/008 138/33 |
| 6,944,394 | B2 | 9/2005 | Long et al. |
| 7,991,273 | B2 | 8/2011 | Sonderegger et al. |
| 2005/0016757 | A1 | 1/2005 | Schwamborn et al. |
| 2006/0086492 | A1* | 4/2006 | Kato ....................... F24H 1/102 165/177 |
| 2006/0252292 | A1 | 11/2006 | Sonderegger et al. |
| 2008/0012293 | A1* | 1/2008 | Freiberger ............ F01N 3/2066 285/133.11 |
| 2009/0034949 | A1 | 2/2009 | Sawada et al. |

(Continued)

FOREIGN PATENT DOCUMENTS

| CN | 1926372 | 3/2007 |
| CN | 101346575 | 1/2009 |

(Continued)

OTHER PUBLICATIONS

E.P.O. Search report in related Application No. 12001338.8 (with partial English language translation); mail date is Oct. 26, 2012.

(Continued)

*Primary Examiner* — Kevin Murphy
(74) *Attorney, Agent, or Firm* — Greenblum & Bernstein, P.L.C.

(57) ABSTRACT

A connector for a heatable fluid line, includes a housing, a pipe connection structured and arranged for connection to a pipe, a connection geometry structured and arranged for connection to a connecting element, a through-channel extending through the pipe connection to the connection geometry, a heater outlet channel being arranged at an angle α≠0° relative to the through-channel, and a ramp element having a guide surface arranged in the through-channel, and oriented to point toward the heater outlet channel.

26 Claims, 1 Drawing Sheet

(56) References Cited

U.S. PATENT DOCUMENTS

2009/0242062 A1* 10/2009 Sawada ............... H05B 3/58
138/32
2010/0193530 A1 8/2010 Leonard et al.

FOREIGN PATENT DOCUMENTS

| CN | 101606014 | 12/2009 |
|---|---|---|
| CN | 201680154 | 12/2010 |
| DE | 34 14 284 | 10/1985 |
| DE | 202008003270 | 10/2009 |
| EP | 0 068 688 | 1/1983 |
| EP | 0068688 | 1/1983 |
| EP | 1 070 642 | 1/2001 |
| EP | 1484945 | 12/2004 |
| FR | 2924786 | 6/2009 |
| GB | 2100559 A | 12/1982 |
| JP | S 582463 | 1/1983 |
| JP | S 60180982 | 11/1985 |
| JP | 5-79593 | 3/1993 |
| JP | 2010-501799 | 1/2010 |
| RU | 2342807 | 4/2006 |
| WO | 2007/073286 | 6/2007 |
| WO | WO2008/023021 | 2/2008 |

OTHER PUBLICATIONS

E.P.O.Search report in related Application No. 12001339.6 (with partial English-language translation); mail date is Oct. 26, 2012.
German Office Action in related Application No. 102001102244.2 (with partial English-language translation); mail date is May 15, 2012.
E.P.O. Search report in related Application No. 12001337.0 (with partial English-language translation); mail date is Oct. 10, 2012.
Chinese Office Action in related application No. 201210141697.5, dated Jan. 27, 2014 (with partial English-language translation).
Korean Office Action in related application No. 10-2012-0051103, dated Feb. 14, 2014 (with English-language translation).
Chinese Office Action in related application No. 201210124052.0, dated Dec. 25, 2013 (with partial English-language translation).
Japanese Office Action in related application No. 2012-112360, dated Aug. 27, 2013 (with partial English-language translation).
Korean Office Action in related application No. 10-2012-0051103, dated Sep. 17, 2013 (with partial English-language translation).
Russian OA in related application No. 2012120423/06 dated May 30, 2013 (with partial English-language translation).
Chinese Office action in related application No. 201210141654.7, dated Dec. 4, 2013, along with English-language translation thereof.
Korean Office action in counterpart application No. 10-2012-0051105, dated Sep. 17, 2013, along with a partial english translation thereof.
Japanese Office action in counterpart application No. 2012-112358, dated Aug. 27, 2013, along with a partial english translation thereof.
Russian Office Action in related application No. 2012120424/06, dated Feb. 26, 2013 (with partial English-language translation).
Japanese Office Action in related application No. 2012-112357, dated Aug. 27, 2013 (with partial English-language translation).
Korean Office Action in related application No. 10-2012-51104, dated Sep. 17, 2013 (with partial English-language translation).
German Office Action in related application No. 10-2011-102 148.9, dated Oct. 13, 2015.

* cited by examiner

CONNECTOR FOR A HEATABLE FLUID LINE AND HEATABLE FLUID LINE

CROSS-REFERENCE TO RELATED APPLICATION

The present application claims priority under 35 U.S.C. §119 of German Patent Application No. 10 2011 102 244.2, filed on May 20, 2011, the disclosure of which is expressly incorporated by reference herein in its entirety.

BACKGROUND OF THE INVENTION

1. Field of the Invention

The invention relates to a connector for a heatable fluid line with a housing. The connector has a pipe connection that can be connected to a pipe, a connection geometry for a connecting element and a heater outlet channel. A through-channel extends through the pipe connection to the connection geometry and the heater outlet channel with the through-channel forming an angle $\alpha \neq 0°$.

Furthermore, the invention relates to a heatable fluid line with a connector of this type.

2. Discussion of Background Information

The invention is explained below based on a fluid line which is used to transport urea from a storage container to a consumption location. Urea is used with diesel engines in order to reduce the emission of nitrogen oxides.

When a fluid line of this type is installed in a motor vehicle, at low outdoor temperatures there is a risk that the urea will freeze in the fluid line so that it can no longer flow. It is therefore known to heat the fluid line, for example, by a heater guided through the pipe.

In many cases the fluid line is composed of several sections that can be connected to one another by connectors. Even when the fluid line is composed of only one single section, it generally requires a connector, with the aid of which the single line section can be connected to the units to be connected, for example, a tank and an injection pump.

The heater can basically be only the length of the single line section. In order to nevertheless achieve the most complete possible heating of the fluid line, the heater is also inserted into the connector. However, the heater must also be removed from the connector again in order not to interfere with the connection geometry.

In the case of a connector that has a through-channel that runs essentially in a straight line, the heater must be guided out laterally. To this end, the heater outlet channel is provided, which stands at an angle of $\neq 0°$ to the through-channel. Angles of 20° to 80° are usual. In order to move the heater into the heater outlet channel, during production, the heater must be inserted through the pipe connection and from the side of the connection geometry an auxiliary tool must be inserted, which deflects the heater so far that it can exit through the heater outlet channel. This makes production complex and susceptible to faults. There is always a risk that the auxiliary tool will also damage the wall of the through-channel, which can lead to leaks in the region of the connection geometry, for example.

SUMMARY OF THE INVENTION

The aim of the invention is to design the production of a heatable fluid line simply.

This aim is attained with the aid of a connector of the type mentioned at the outset in that a ramp element is arranged in the through-channel, which ramp element has a guide surface pointing out of the through-channel towards the heater outlet channel.

The ramp element is permanently located in the connector. It is able to deflect the heater that is inserted through the pipe connection such that it can enter the heater outlet channel. This is carried out in that the tip of the heater strikes the guide surface and is guided by the guide surface into the heater outlet channel. As soon as the tip of the heater has reached the heater outlet channel, a simple further pushing of the heater with respect to the connector allows the heater to exit from the opening of the heater outlet channel to the outside. A connector with ramp element requires only slightly more material than a connector without a ramp element. For this, an auxiliary tool that guides the heater into the heater outlet channel is now no longer necessary in the production of the fluid line.

The guide surface is preferably embodied in a kink-free manner. The guide surface is therefore smooth so that the tip of the heater can slide along the guide surface in order to thus to divert the direction of movement of the heater in the heater outlet channel. There are no steps on which the tip could get caught. This further facilitates production.

It is preferred hereby that the ramp element fills the through-channel in a plane that is spanned through the through-channel and the heater outlet channel and leaves a flow cross section free in the through-channel in a plane perpendicular thereto. The tip of the heater, which is guided through the pipe connection, is thus guided over the entire "height" of the through-channel in the direction of the heater outlet channel. In this direction the guide surface is continuous from a region in the circumferential wall of the through-channel that lies opposite the heater outlet channel, through to the heater outlet channel. Nevertheless, a sufficient flow cross section is retained in the through-channel in order to make it possible for the fluid, in the present case the urea, to flow through. The ramp element does not fill the cross section of the through-channel completely therefore, but leaves sufficient openings.

Preferably, the ramp element has a width that is no more than 50% of the largest width of the through-channel in the region of the ramp element. Thus a further 50% of the width remains free for the fluid to flow through, that is, which is not blocked by the ramp element. Even when the cross section of the through-channel is circular and the ramp element is arranged in the region of the largest diameter, sufficient cross-sectional area is available to allow the fluid to flow through the connector. The width of no more than 50%, however, is sufficient to provide an adequately wide guide surface for the tip of the heater. In many cases even a smaller width is sufficient, for example, 33% or even only 25% of the maximum width.

Preferably, the ramp element is connected to the housing at both ends of the guide surface. The guide surface is thus held with sufficient forces so that the tip of the heater can slide along it without the guide surface being displaced. In particular the guide surface cannot tilt such that the guidance of the tip of the heater into the heater outlet channel is interrupted.

Preferably, the ramp element is embodied in one piece with the housing. The ramp element can be injected in one piece with the housing, for example, if the housing is embodied as an injection molded part. Virtually no additional expenditure is then necessary for the production and the insertion of the ramp element into the connector.

Preferably, the guide surface continues in a wall of the heater outlet channel. Even with the transition of the guide surface into the heater outlet channel there are therefore no steps or the like either that could lead to disturbances in production during the introduction of the heater into the connector and then into the heater outlet channel.

The aim is attained by a heatable fluid line with a connector, as described above, and a pipe that is connected to the pipe connection, wherein a heater is arranged in the pipe, which heater is guided out of the connector through the heater outlet channel.

As described above, due to the ramp element with the guide surface it is relatively simply possible to insert the tip of the heater through the connection into the interior of the connector and allow it to exit out of the heater outlet channel, because the ramp element ensures that during the insertion of the heater into the connector, the tip is deflected to the heater outlet channel.

Preferably, the heater has a diameter that is larger than a largest distance between the ramp element and a wall of the through-channel. This prevents the heater from being able to pass by the ramp element at the side. In a case of this type it would no longer be possible to guide the tip of the heater on the ramp element. If the distance between the ramp element and the wall of the through-channel is correspondingly small, however, it is ensured in any case that the heater is guided by the ramp element with its guide surface to the heater outlet channel.

Aspects of the disclosure are directed to a connector for a heatable fluid line, the connector comprising a housing, a pipe connection structured and arranged for connection to a pipe, a connection geometry structured and arranged for connection to a connecting element, a through-channel extending through the pipe connection to the connection geometry, a heater outlet channel being arranged at an angle $\alpha \neq 0°$ relative to the through-channel, and a ramp element having a guide surface arranged in the through-channel, and oriented to point toward the heater outlet channel.

In further embodiments, the guide surface is embodied in a kink-free manner.

In additional embodiments, the ramp element is arranged to span the through-channel in a plane passing through the through-channel and the heater outlet channel, while defining a flow cross-section in the through-channel in a plane perpendicular to the plane passing through the through-channel and the heater outlet channel.

In yet further embodiments, the ramp element comprises a width that is no more than 50% of a largest width of the through-channel in a region of the ramp element.

In embodiments, the ramp element is connected to the housing at both ends of the guide surface.

In further embodiments, the ramp element is embodied in one piece with the housing.

In additional embodiments, the guide surface continues in a wall of the heater outlet In yet further embodiments, $20° \leq \alpha \leq 80°$.

Aspects of the disclosure are also directed to a heatable fluid line comprising: a connector, a pipe connected to the pipe connection, and a heater having a portion arranged in the pipe, and another portion extending out of the connector through the heater outlet channel.

In further embodiments, the heater comprises a heater rod having at least one heating conductor.

In yet further embodiments, the heater has one of a diameter and a width that is larger than a largest distance between the ramp element and a wall of the through-channel.

In additional embodiments, the ramp element precludes passage of the heater into the connection geometry.

Aspects of the disclosure are also directed to a method of assembling a heatable fluid line having a connector including a housing, a pipe connection structured and arranged for connection to a pipe, a connection geometry structured and arranged for connection to a connecting element, a through-channel extending through the pipe connection to the connection geometry, a heater outlet channel arranged at an angle $\alpha \neq 0°$ relative to the through-channel, and a ramp element having a guide surface arranged in the through-channel. The method comprises guiding a heater along the ramp element, whereby the heater is arranged to extend from the through-channel into the heater outlet channel.

In further embodiments, the heater is coupled to the pipe, such that the heater is guided along the ramp element toward the heater outlet channel as the pipe is connected to the pipe connection.

In additional embodiments, the method further comprises attaching the pipe to the connector after the heater is inserted.

In yet further embodiments, the heater is inserted through the heater outlet channel to be guided by the ramp element in a direction away from the connection geometry.

In embodiments, the heater is inserted through the pipe connection to be guided by the ramp element in a direction towards the heater outlet channel.

In additional embodiments, the ramp element spans the through-channel in a plane passing through the through-channel and the heater outlet channel, and the ramp element provides a flow cross-section in the through-channel in a plane perpendicular to the plane passing through the through-channel and the heater outlet channel.

In yet further embodiments, the ramp element comprises a width that is no more than 50% of a largest width of the through-channel in a region of the ramp element.

In further embodiments, the ramp element precludes passage of the heater into the connection geometry.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
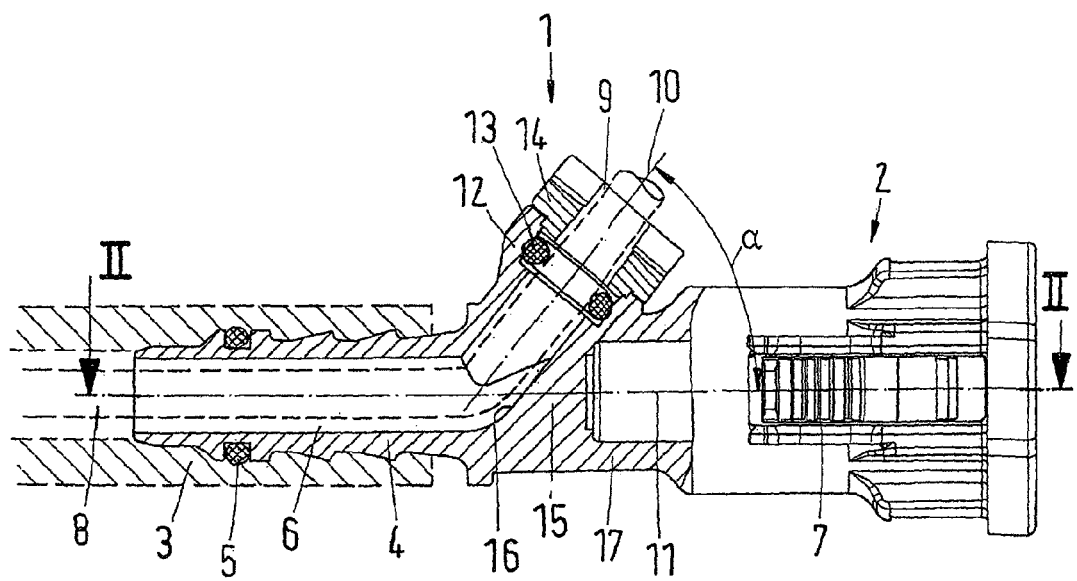
FIG. 1 illustrates a diagrammatic longitudinal section through a connector with a connected pipe.

FIG. 1 shows a heatable fluid line 1 with a connector 2 and a pipe 3. The pipe is flexible. It can be formed by an extruded plastic or also by a tubing material. When used below, the term "pipe" should also cover a hose.

The pipe 3 is placed onto a pipe connection 4 of the connector 2 and sealed there with an O-ring 5. The pipe connection 4 has on its outside a pine-tree profile. If necessary, the pipe 3 can also be fixed on the pipe connection 4 with the aid of a clamping element, for example, a hose clamp or the like.

Figure 2:
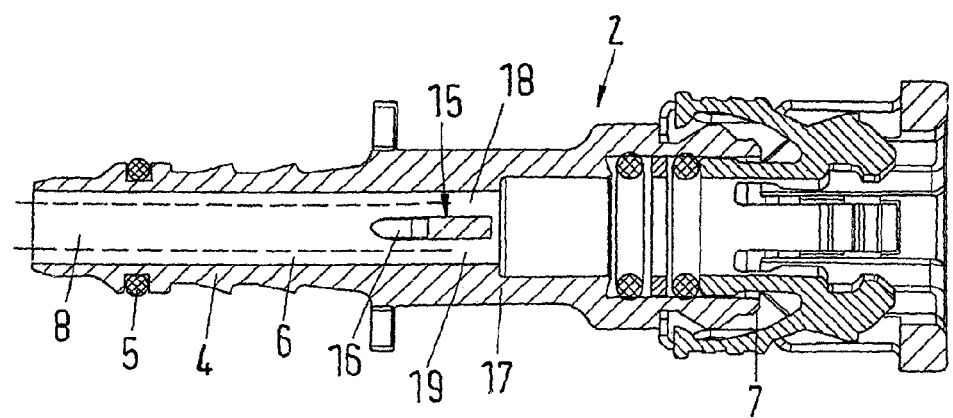
FIG. 2 illustrates a section II-II according to FIG. 1.

A through-channel 6 is guided through the pipe connection 4, which through-channel 6 runs in a straight-line manner through the entire connector and, as can be seen in FIG. 2, is guided up to a connection geometry 7. With the connection geometry 7 the connector 2 can be attached to a pipe connector of another line, a tank or an assembly. The precise shape of the connection geometry 7 is irrelevant in the present case. However, it should be embodied such that a connection between the connector 2 and a pipe connection has a sufficient strength and tightness.

A heater 8 shown by a dashed line is arranged in the free cross section of the pipe 3. The heater 8 in the present case is embodied as a flexible heater rod, which has at least one heating conductor, which is embedded into an extruded plastic material. Preferably, two heating conductors are provided, which are connected to one another at one end at a distance from the connector 2, so that an electrical supply is necessary at only one end of the heater. Although the heater 8 is flexible and bendable, it has a certain inherent stiffness so that when the pipe 3 (with the heater located therein) is pushed onto the pipe connection 4, the heater 8 can be inserted into the through-channel 6 in the pipe connection 4.

The heater 8 should leave the connector 2 before it reaches the connection geometry 7, in order not to interfere with a connection established with the aid of the connection geometry 7. Accordingly, the connector 2 has a heater outlet channel 9, the longitudinal axis 10 of which is at an angle α to the longitudinal axis 11 of the through-channel 6. The angle α is greater than 0° and preferably lies in the range of 20° to 80°.

The heater outlet channel 9 is arranged in a connection 12, which is directed at the angle α to the longitudinal axis 11 of the through-channel 6. An O-ring 13 is provided in the pipe connection 12. The O-ring 13 bears in a sealing manner against the heater 8 and prevents fluid from leaking out of the heater outlet channel. The O-ring 13 is held in the heater outlet channel 9 with the aid of a plug 14, which is arranged in the pipe connection 12. However, the plug 14 holds the O-ring only in place. It therefore does not compress it.

As explained above, the heater 8 has a certain inherent stiffness. Therefore no auxiliary tools are necessary in order to deflect the heater 8, the tip of which is guided essentially along the longitudinal axis 11 through the through-channel 6, such that the heater 8 exits through the heater outlet channel 9. To this end a ramp element 15 is arranged in the through-channel 6, which ramp element can be seen in particular in FIG. 2. The ramp element 15 is embodied in one piece with the connector 2. If the connector 2 is embodied as an injection molded part, the ramp element 15 is produced with it during injection molding.

The ramp element 15 has a guide surface 16, which is curved, i.e., embodied in a kink-free manner. The guide surface 16 extends from the "underside" of the through-channel 6, that is, the side that lies opposite the heater outlet channel 9, up to the heater outlet channel 9 and continues in a wall of the heater outlet channel 9. The tip of the heater 8 can thus slide along the guide surface 16 without being impeded by steps, kinks, grooves or the like. When the heater 8 is guided through the pipe connection 4 into the through-channel 6, the tip is deflected by the guide surface 16 of the ramp element 15 such that it automatically reaches the heater outlet channel 9.

In the plane of the sectional view according to FIG. 1, that is, in a plane that is spanned by the longitudinal axis 11 of the through-channel 6 and the longitudinal axis 10 of the heater outlet channel 9, the ramp element 15 fills the through-channel 6 completely. The ramp element 15 is thus connected at both ends of the guide surface 16 to the housing 17 of the connector 2. There is therefore no danger that the ramp element 15 will tilt when it is acted on with force by the tip of the heater 8. As can be seen in particular in FIG. 2, however, the ramp element 15 does not fill the through-channel 6 completely. In fact, transverse to the plane shown in FIG. 1 it leaves two flow cross sections 18, 19 free, through which cross sections in operation the fluid can continue to flow. The ramp element 15 reduces the free cross section of the through-channel 6 somewhat, but it still leaves sufficient cross section free for the flow of the fluid.

It is discernible that the two flow cross sections 18, 19 each have a width that is smaller than the diameter of the heater 8. Accordingly, in any case it is ensured that the heater 8 is deflected by the guide surface 16 in the direction of the heater outlet channel 9 when the heater 8 is inserted into the connector 2. On the other hand, the ramp element 15 has a width that corresponds to no more than 50% of the largest width of the through-channel 6 in the region of the ramp element 15.

If the heater does not have a circular cross section and accordingly no actual diameter, the width of the heater 8 in the width direction of the flow cross sections 18, 19 is larger than the width of each of the flow cross sections 18, 19, so that it is also reliably ensured in this case that the heater during insertion into the connector is deflected by the ramp element 15.

The production of a heatable fluid line 1 with a connector 2 of this type is relatively simple. The pipe 3 with the heater 8 must merely be preassembled so that the heater 8 projects from the pipe 3 by a predetermined length. Thus before the pipe 3 is pushed onto the pipe connection 4, the heater 8 already reaches the through-channel 6 in the interior of the pipe connection 4. If the pipe 3 and the heater 8 are then moved further jointly, in order to push the pipe 3 onto the pipe connection 4, then the tip of the heater 8 is deflected by the guide surface 16 on the ramp element 15 so that this tip reaches the heater outlet channel 9 and can exit there from the connector 2.

Of course it is also possible to insert the heater 8 alone into the connector 2 and then to guide the pipe 3 over the heater 8 and to push it onto the pipe connection 4.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of assembling a heatable fluid line having a connector including a housing, a pipe connection structured and arranged for connection to a pipe, a connection geometry structured and arranged for connection to a connecting element, a through-channel extending through the pipe connection to the connection geometry, a heater outlet channel arranged at an angle $\alpha \neq 0°$ relative to the through-channel, and a ramp element having a guide surface arranged in the through-channel, the method comprising:
guiding a heater from the through-channel out of the through-channel via contact of a tip of the heater with the ramp element, whereby the heater is arranged to extend from the through-channel and divert into the heater outlet channel.

2. The method of claim 1, wherein the heater is coupled to the pipe, such that the heater is guided along the ramp element toward the heater outlet channel as the pipe is connected to the pipe connection.

3. The method of claim 1, further comprising attaching the pipe to the connector after the heater is inserted.

4. The method of claim 1, wherein the heater is inserted through the heater outlet channel to be guided by the ramp element in a direction away from the connection geometry.

5. The method of claim 1, wherein the heater is inserted through the pipe connection to be guided by the ramp element in a direction towards the heater outlet channel.

6. The method of claim 1, wherein the ramp element spans the through-channel in a plane passing through the through-channel and the heater outlet channel, and the ramp element provides a flow cross-section in the through-channel in a plane perpendicular to the plane passing through the through-channel and the heater outlet channel.

7. The method of claim 1, wherein the ramp element comprises a width that is no more than 50% of a largest width of the through-channel in a region of the ramp element.

8. The method of claim 1, wherein the ramp element precludes passage of the heater into the connection geometry.

9. A connector for a heatable fluid line, comprising:
a housing;
a pipe connection structured and arranged for connection to a pipe;
a connection geometry structured and arranged for connection to a connecting element;
a through-channel extending through the pipe connection to the connection geometry;
a heater outlet channel being arranged at an angle $\alpha \neq 0°$ relative to the through-channel; and
a ramp element having a guide surface arranged in the through-channel, and oriented to point toward the heater outlet channel,
wherein the ramp element comprises sidewalls extending from opposite sides of the housing, wherein the sidewalls are approximately parallel to each other and approximately parallel to a plane that is spanned through the through-channel and the heater outlet channel.

10. The connector according to claim 9, wherein the ramp element partially fills the through-channel in a plane that is spanned through the through-channel and the heater outlet channel.

11. The connector according to claim 9, wherein the guide surface is embodied in a kink-free manner.

12. The connector according to claim 9, wherein the ramp element is arranged to span the through-channel in a plane passing through the through-channel and the heater outlet channel, while defining a flow cross-section in the through-channel in a plane perpendicular to the plane passing through the through-channel and the heater outlet channel.

13. The connector according to claim 9, wherein the ramp element comprises a width that is no more than 50% of a largest width of the through-channel in a region of the ramp element.

14. The connector according to claim 9, wherein the ramp element and the housing are embodied as one element of one material.

15. The connector according to claim 9, wherein the guide surface continues in a wall of the heater outlet channel.

16. The connector according to claim 9, wherein $20° \leq \alpha \leq 80°$.

17. A heatable fluid line comprising:
a connector according to claim 9;
a pipe connected to the pipe connection; and
a heater having a portion arranged in the pipe, and another portion extending out of the connector through the heater outlet channel.

18. The fluid line according to claim 17, wherein the heater comprises a heater rod having at least one heating conductor.

19. The fluid line according to claim 17, wherein the heater has one of a width and a diameter that is larger than a largest distance between the ramp element and a wall of the through-channel.

20. The fluid line according to claim 17, wherein the ramp element precludes passage of the heater into the connection geometry.

21. The connector according to claim 9,
wherein the ramp element is formed as one element of one material with the housing at both ends of the guide surface.

22. The connector according to claim 9, wherein an entrance to heater outlet channel is formed in a wall of the housing, and wherein the guide surface is structured and arranged to extend to the entrance.

23. The connector according to claim 9, wherein the ramp element is formed as one-piece with the housing and as an internal surface of the housing.

24. The connector according to claim 9, wherein both ends of the ramp element are joined integrally with the housing.

25. The connector according to claim 9, wherein the ramp element is permanently located in the connector.

26. The connector according to claim 9,
wherein the ramp element occupies a portion of the through-channel extending from opposite sides of the housing along a plane that is spanned through the through-channel and the heater outlet channel.

* * * * *